US009720590B2

(12) United States Patent
Moon et al.

(10) Patent No.: US 9,720,590 B2
(45) Date of Patent: Aug. 1, 2017

(54) ELECTRONIC APPARATUS AND METHOD OF RECOGNIZING A USER GESTURE

(71) Applicant: SAMSUNG ELECTRONICS CO., LTD., Suwon-si (KR)

(72) Inventors: Jong-bo Moon, Suwon-si (KR); Chang-soo Noh, Yongin-si (KR); Hyun-kyu Yun, Seoul (KR); Jong-keun Lee, Seoul (KR); Je-sun Hwang, Bucheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/339,989

(22) Filed: Jul. 24, 2014

(65) Prior Publication Data
US 2015/0116280 A1    Apr. 30, 2015

(30) Foreign Application Priority Data

Oct. 28, 2013    (KR) .................. 10-2013-0128712

(51) Int. Cl.
*G06F 3/0488*    (2013.01)
*G06F 3/041*    (2006.01)

(52) U.S. Cl.
CPC ........ *G06F 3/04883* (2013.01); *G06F 3/0416* (2013.01); *G06F 2203/04108* (2013.01)

(58) Field of Classification Search
None
See application file for complete search history.

(56) References Cited

U.S. PATENT DOCUMENTS

| 2010/0321289 | A1  | 12/2010 | Kim et al. |
| 2011/0016390 | A1  | 1/2011  | Oh et al. |
| 2011/0109577 | A1* | 5/2011  | Lee ................. G06F 3/04883 345/173 |
| 2011/0175831 | A1* | 7/2011  | Miyazawa .......... G06F 3/041 345/173 |

(Continued)

FOREIGN PATENT DOCUMENTS

| EP | 2634680 A1 | 9/2013 |
| EP | 2645218 A1 | 10/2013 |
| WO | 2013/157400 A1 | 10/2013 |

OTHER PUBLICATIONS

Written Opinion dated Jan. 9, 2015 issued by International Searching Authority in counterpart International Application No. PCT/KR2014/009429.

(Continued)

*Primary Examiner* — Jennifer Mehmood
*Assistant Examiner* — Parul Gupta
(74) *Attorney, Agent, or Firm* — Sughrue Mion, PLLC

(57) ABSTRACT

An electronic apparatus including a proximity sensor is provided. The apparatus includes a touch sensor configured to sense a touch trace of the object in response to a user gesture of touching the electronic apparatus using an object and moving the touched point being input, a proximity sensor configured to sense a motion of the object before and after the touch, and a controller configured to change the touch trace based on a direction of motion of the object before and after the touch, and recognize the user gesture according to the changed touch trace. Accordingly, the touch trace may be changed and thus, an accurate control operation may be performed.

18 Claims, 12 Drawing Sheets

(56) References Cited

U.S. PATENT DOCUMENTS

| | | | |
|---|---|---|---|
| 2011/0285657 A1 | 11/2011 | Shimotani et al. | |
| 2012/0065511 A1* | 3/2012 | Jamello, III | A61B 8/0883 |
| | | | 600/443 |
| 2012/0206380 A1 | 8/2012 | Zhao et al. | |
| 2015/0002424 A1* | 1/2015 | Yamamoto | G06F 3/04883 |
| | | | 345/173 |
| 2015/0054780 A1 | 2/2015 | Manba | |

OTHER PUBLICATIONS

International Search Report dated Jan. 9, 2015 issued by International Searching Authority in counterpart International Application No. PCT/KR2014/009429.
Communication dated May 19, 2017, from the European Patent Office in counterpart European Application No. 14856835.5.

\* cited by examiner

ELECTRONIC APPARATUS AND METHOD OF RECOGNIZING A USER GESTURE

CROSS-REFERENCE TO RELATED APPLICATIONS

This application claims priority from Korean Patent Application No. 10-2013-0128712, filed in the Korean Intellectual Property Office on Oct. 28, 2013, the disclosure of which is incorporated herein by reference, in its entirety.

BACKGROUND

1. Technical Field

Methods and apparatuses consistent with the exemplary embodiments relate to an electronic apparatus and a method for recognizing a user gesture. More particularly, the exemplary embodiments relate to an electronic apparatus including a proximity sensor and a method of recognizing a user gesture.

2. Description of the Related Art

Recently, various electronic apparatuses provide a touch panel in order to allow a user to more easily perform a user manipulation. That is, a user may control an electronic apparatus easily through a touch input.

Specifically, not only small-scale electronic apparatuses such as a remote controller and a mobile phone but also large-scale electronic apparatuses such as a television and a notebook PC generally provide a touch panel, and a user may input a user command to control such electronic apparatuses through a touch input.

However, when the touch panel of an electronic apparatus is too small or when a user tries to control an electronic apparatus using only one hand, a touch trace which is not intended by the user may be inadvertently input.

For example, unlike a user's intention to input a touch trace in a longitudinal direction, a touch trace of a curved line may be input according to a direction in which the user grips an electronic apparatus. Consequently, the electronic apparatus may react in a way which is different from what the user intended, and an event may occur accordingly.

Therefore, a technology is required for allowing a user to correct the user's touch input when the touch input is not input as the user intended.

SUMMARY

An aspect of the exemplary embodiments relates to an electronic apparatus which includes a proximity sensor and may change a touch trace input by a user, and a method of recognizing a user gesture.

An electronic apparatus according to an exemplary embodiment includes a touch sensor configured to sense a touch trace of the object in response to a user gesture of touching the electronic apparatus using an object and moving the touched point being input, a proximity sensor configured to sense a motion of the object before and after the touch, and a controller configured to change the touch trace based on a direction of motion of the object before and after the touch, and recognize the user gesture according to the changed touch trace.

The controller may be configured to change the touch trace by applying a different weighted value to a motion of the object before and after the touch, according to a distance from the touched point.

The controller may be configured to change the touch trace by applying a first weighted value to a motion direction of an object which is sensed before the touch starts and applying a second weighted value which is greater than the first weighted value to a motion direction of an object which is sensed after the touch ends.

The touch sensor may be configured to apply an operation grid in a predetermined form to a plurality of touch sensors which are disposed in a form of matrix and sense the touched point with reference to the operation grid, and the controller may be configured to determine a direction of a user's grip regarding the electronic apparatus based on a motion of the object which is sensed through the proximity sensor, change the operation grid according to the direction of the user's grip direction and recognize the user gesture with reference to the changed operation grid.

The controller may be configured to change each cell of the operation grid to tilt from the first direction to a second direction in response to the user's grip direction being a first direction, and may be configured to change each cell of the operation grid to tilt from the second direction to the first direction of the display in response to the user's grip direction being the second direction.

The apparatus may further include a display and the controller may be configured to change each cell of the operation grid to tilt from the right direction of the display to the left direction in response to the user's grip direction being a right direction of the display, and change each cell of the operation grid to tilt from the left direction of the display to the right direction in response to the user's grip direction being a left direction of the display.

The controller may be configured to recognize a line connecting a motion of the object which is sensed through the proximity sensor right before and after the touch with a touch start point sensed through the touch sensor as the user gesture.

The controller may be configured to change the touch trace by adding a touch trace sensed by the touch sensor, a motion trace of the object before the touch starts, and a motion trace of the object after the touch ends.

A method of recognizing a user gesture according to an exemplary embodiment includes sensing a touch trace of the object, sensing a proximate motion of the object before and after the touch through a proximity sensor in response to a user gesture of touching the electronic apparatus using an object and moving the touched point being input, changing the touch trace based on a proximate motion direction of the object before and after the touch, and recognizing the user gesture according to the changed touch trace.

The changing the touch trace may include changing the touch trace by applying a different weighted value to a motion of the object before and after the touch, according to a distance from the touched point.

The changing the touch trace may include changing the touch trace by applying a first weighted value to a motion direction of an object which is sensed before the touch starts and applying a second weighted value which is greater than the first weighted value to a motion direction of an object which is sensed after the touch ends.

The touch sensor may apply an operation grid in a predetermined form to a plurality of touch sensors which are disposed in a form of matrix and sense the touched point with reference to the operation grid, and the recognizing the user gesture may include determining a user's grip direction regarding the electronic apparatus based on a motion of the object which is sensed through the proximity sensor, changing the operation grid according to the user's grip direction and recognizing the user gesture with reference to the changed operation grid.

The changing the touch trace may include changing each cell of the operation grid to tilt from the first direction to a second direction in response to the user's grip direction being a first direction, and in response to the user's grip direction being the second direction, changing each cell of the operation grid to tilt from the second direction to the first direction.

The recognizing the user gesture may include recognizing a line which connects a motion of the object which is sensed through the proximity sensor right before and after the touch with a touch start point sensed through the touch sensor as the user gesture.

The changing the touch trace may include changing the touch trace by adding a touch trace sensed by the touch sensor, a motion trace of the object before the touch starts, and a motion trace of the object after the touch ends.

An aspect of the exemplary embodiments may provide an electronic apparatus comprising: a touch sensor configured to sense a touch trace of an object in response to a user gesture; a proximity sensor configured to sense a motion of the object before and after the touch; and a controller configured to change the touch trace based on a direction of motion of the object before and after the touch, wherein the controller is configured to change the touch trace by applying a first weighted value to a motion direction of an object which is sensed before the touch starts and applying a second weighted value which is greater than the first weighted value to a motion direction of an object which is sensed after the touch ends, and recognize the user gesture according to the changed touch trace.

The user gesture may include touching the electronic apparatus using the object and moving the touched point being input.

The touch sensor may be configured to apply an operation grid in a predetermined form to a plurality of touch sensors which are disposed in a form of a matrix and sense the touched point with reference to the operation grid.

The controller may be configured to determine a direction of a user's grip regarding the electronic apparatus based on a motion of the object which is sensed through the proximity sensor and changes the operation grid according to the user's grip direction and recognizes the user gesture with reference to the changed operation grid.

The controller may be configured to change each cell of the operation grid to tilt from the first direction to a second direction in response to the direction of the user's grip direction being a first direction, and change each cell of the operation grid to tilt from the second direction to the first direction of the display in response to the user's grip direction being the second direction.

The controller may be configured to recognize a line connecting a motion of the object which is sensed through the proximity sensor right before and after the touch with a touch start point sensed through the touch sensor as the user gesture.

BRIEF DESCRIPTION OF THE DRAWINGS

The above and/or other aspects of the will be more apparent by describing certain exemplary embodiments with reference to the accompanying drawings, in which.

DETAILED DESCRIPTION OF THE EXEMPLARY EMBODIMENTS

The method steps and system components have been represented by symbols of the related art in the figures, showing only specific details which are relevant for an understanding of the exemplary embodiments. Further, details may be readily apparent to person ordinarily skilled in the art may not have been disclosed. In the exemplary embodiments, relational terms such as first and second, and the like, may be used to distinguish one entity from another entity, without necessarily implying any actual relationship or order between such entities.

Figure 1:
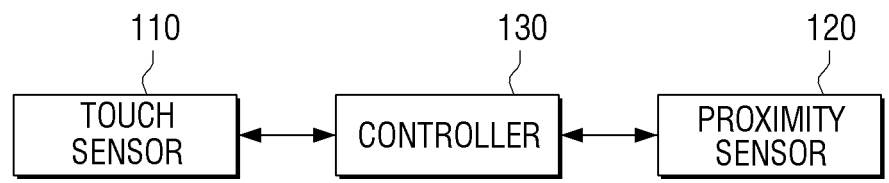
FIG. 1 is a block diagram which illustrates a configuration of an electronic apparatus according to an exemplary embodiment.

FIG. 1 is a block diagram which illustrates a configuration of an electronic apparatus 100 briefly according to an exemplary embodiment. As illustrated in FIG. 1, the electronic apparatus 100 includes a touch sensor 110, a proximity sensor 120 and a controller 130. The electronic apparatus 100 may be a mobile phone, and this is only an example. The electronic apparatus 100 may be implemented as various apparatuses having the touch sensor 110, such as a remote controller, a tablet PC, a digital camera, a camcorder, a notebook PC, PDA and television.

The touch sensor 110 senses a touch input. In particular, the touch sensor may sense the touch trace of the object in response to a user gesture of touching the touch sensor 110 using an object and moving the touched point.

The object may be a user's finger or a tool such as a touch pen which may touch the touch sensor 110.

Specifically, the touch sensor 110 may sense that the user gesture is input in a longitudinal direction from left to right in response to a user gesture of touching one portion of the touch sensor 110 using a user's finger or a pen and moving the touched point horizontally in a direction towards the right being input.

The proximity sensor 120 senses a proximate motion of an object. That is, even if an object is separate from the proximity sensor 110 before a touch starts and after a touch ends, the proximity sensor 12 may sense a proximate motion of the object within a certain range.

Figure 2:
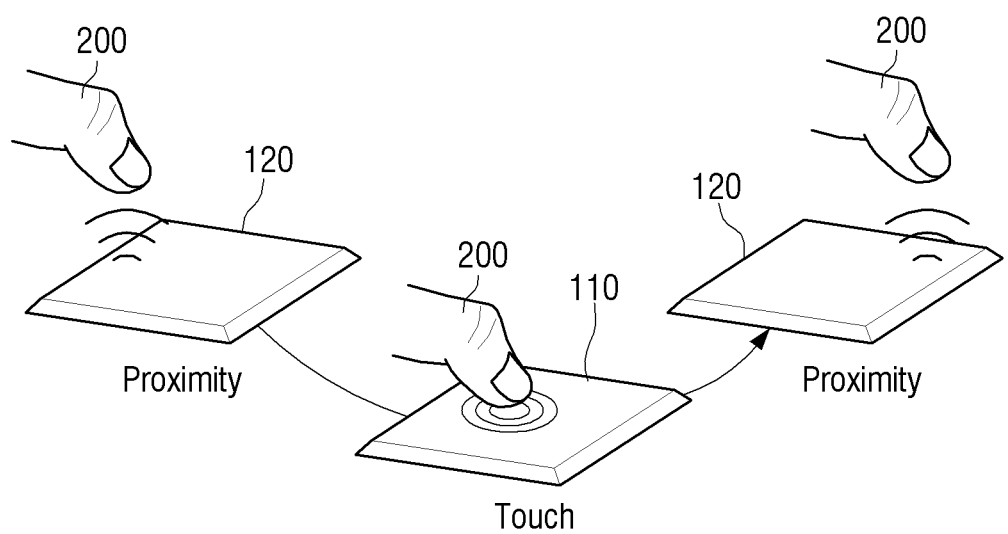
FIGS. 2 and 3 are views illustrating a process of sequentially inputting a touch command by a user.

That is, in response to a touch input of a user's finger 200 being sensed in the touch sensor 110, as illustrated in FIG. 2, and the user's finger 200 being a predetermined distance from the proximity sensor 120 before and after the touch input, the proximity sensor 122 may sense a proximate motion of the object.

Figure 3:
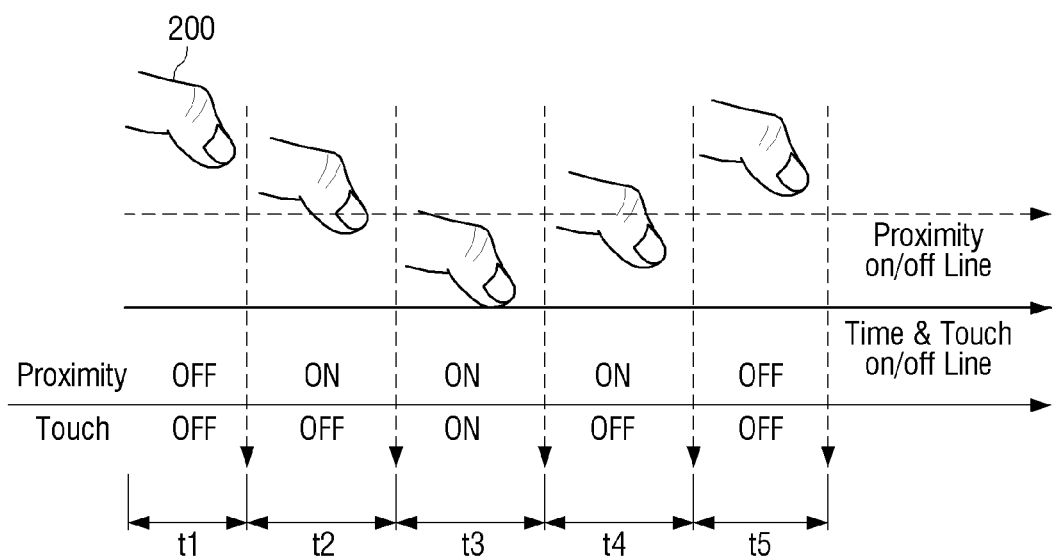

In addition, the touch sensor 110 and the proximity sensor 120 may exist in an overlapping manner. Specifically, as illustrated in FIG. 3 in response to the user's finger 200 going beyond a predetermined distance from the touch sensor 110 and the proximity sensor 120 as t1 and t5 when the touch sensor 110 and the proximity sensor 120 exist in an overlapping manner, the touch sensor 110 and the proximity sensor 120 may not sense the presence of the object.

In response to the user's finger 200 being within a predetermined distance from the touch sensor 110 and the proximity sensor 120 as t2 and t4, the proximity sensor 120 may sense a motion of the object. Meanwhile, the predetermined distance which can be sensed by the proximity sensor 120 may vary according to the initial setting of the electronic apparatus 100 and the characteristics of the proximity sensor 120.

In addition, in response to the user's finger 200 touching the touch sensor 110 and the proximity sensor 120 at t3, the touch sensor 110 may sense a touch input of the object.

The touch sensor 110 and the proximity sensor 120 may exist on the display 140, which will be described later.

The controller 130 is an element to control overall operations of the electronic apparatus 100. Based on a proximate direction of motion of an object sensed by the proximity sensor 120 before and after a touch, the controller 130 may change a touch trace sensed by the touch sensor 110 and recognize a user gesture according to the changed touch trace.

The method for changing a touch trace may be implemented in various ways depending on the exemplary embodiment.

For example, according to an exemplary embodiment, the controller 130 may estimate a touch trace intended by a user by considering all of the actual touch trace and a motion of an object before and after a touch, and change an actual touch trace to the estimated touch trace. The controller 130 may recognize a user gesture according to the changed touch trace.

For example, even in response to a touch trace sensed by the touch sensor 110 being in the shape of an arc, in response to a determination that a touch trace in the shape of a straight line is drawn by a user based on a direction of a proximate motion of an object which is sensed before and after input of the touch trace through the touch sensor 110, the controller 130 may determine that the touch trace is in the shape of straight line and recognize that a user gesture is to input a touch input of a straight line.

According to another exemplary embodiment, the controller 130 may apply a different weighted value for each section with respect to a motion of an object.

Specifically, with respect to coordinate values at a location where a motion of an object is sensed before and after a touch, the controller 130 may apply a different weighted value according to a distance from a touched point and may change a touch trace. Accordingly, a motion of an object at a location which is far from a touch start point from among motions before a touch, may be reflected as being relatively small or may be disregarded, and a motion of an object at a location which is close to a touch end point may be reflected as being relatively large.

The controller 130 may determine and change a touch trace based on a touch coordinates value respectively sensed by the touch sensor 110 and a proximity coordinates value sensed through the proximity sensor 120.

A proximate motion of an object before and after a touch which is sensed through the proximity sensor 120 may be sensed differently according to a touch trace. Accordingly, a touch trace may be changed such that the closer a motion of an object before and after a touch to a touched point, the higher a weighted value applied, and the farther a motion of an object before and after a touch from a touched point, the lower a weighted value applied as the motion is more likely to go beyond the touch trace intended by a user.

In addition, there are more cases in which a proximate motion of an object after a touch is more distinctive according to a touch trace in comparison with a proximate motion of an object before a touch.

In this case, the controller 130 may apply a different weighted value with respect to a motion before and after a touch. For example, the controller 130 may apply a first weighted value with respect to a direction of an object motion sensed before a touch starts, and apply a second weighted value which is greater than the first weighted value with respect to a direction of an object motion sensed after the touch ends. The first and the second weighted values may vary according to the initial setting of the electronic apparatus 100 or a user's setting. For example, the first weighted value may be set to '0' or another small value which corresponds to '0'.

According to another exemplary embodiment, the controller 130 may set an operation grid, and determine a user gesture with reference to the operation grid.

Specifically, the controller 130 may determine a direction of a user's hand which grips the electronic apparatus 100 based on a motion of an object sensed through the proximity sensor 120, and control the touch sensor 110 to have a changed operation grid according to the determined direction of the user's hand. Herein, the changed operation grid means that the shape of the grid is changed according to the direction in which the electronic apparatus 100 is gripped by the user.

The operation grid is a line in the form of grid, which is a reference for determining a location of a user's touch input. For example, the operation grid may be in the form of a grid consisting of squares.

The controller 130 may determine which type of user gesture is input by applying an operation grid with respect to a touch coordinates or proximity coordinates respectively sensed by the touch sensor 110 and the proximity sensor 120.

In the case where the touch sensor 110 senses a user touch with respect to the display 140, the operation grid may be implemented in various sizes and shapes according to the size and shape of the display 140.

The controller 130 changes a motion of an object sensed by the touch sensor 110 and the proximity sensor 120 to coordinate values matched with an operation grid. Meanwhile, a distorted operation grid means that the shape of the grid is changed according to a direction in which a user grips the electronic apparatus 100.

For example the controller 130 determines a direction of a user's grip regarding an electronic apparatus based on the motion or the sensed location in response to a motion of an object being sensed by the proximity sensor 120. The controller 130 changes an operation grid according to the user's grip direction, and determines the type of user gesture based on the changed operation grid.

Specifically, an operation grid may be changed according to a user's grip direction. That is, in response to a user's grip direction being a first direction, each cell of an operation grid may be changed to tilt from the first direction to the second direction, and in response to a user's grip direction being a second direction, each cell of the operation grid may be changed to tilt from the second direction to the first direction of the display.

For example, in response to the electronic apparatus 100 includes the display 140, the first direction may be the right direction of the display 140, and the second direction may be the left direction of the display 140. That is, in response to a user's grip direction being the right direction of the display 140, the controller 130 may change each cell of an operation grid to tile from the right direction to the left direction of the display 140. On the other hand, in response to a user's grip direction being the left direction of the display 140, the controller 130 may change each cell of the operation grid from the left direction to the right direction of the display.

Specifically, a user's hand determined by the controller 130 is in the right direction, a grid consisting of squares is tilted downwards from right to left, and a user's hand determined by the controller 130 is in the left direction, a grid consisting of squares is tilted downwards from left to right. The method for determining the direction of a user's hand and the detailed description of a distorted operation grid will be provided later.

Meanwhile, according to another exemplary embodiment, the controller 130 may recognize a line connecting a motion of an object sensed through the proximity sensor 120 right after a touch ends with a start point of a user's touch input through the touch sensor 110 as a user gesture.

That is, in most cases, the start point of a touch input is consistent with a user's intention, however the end point of a touch input may not be consistent with a user's intention when the size of the touch sensor 110 is too small or when a user controls the electronic apparatus 100 using one hand.

In this case, an object after the touch ends may be separated from the touch sensor 110 and thus, no touch input is input, the object may move in a direction as the user intended. Herein, the proximity sensor 120 may sense a proximate motion. The controller 130 may connect the touch start point with a point where the proximate object is sensed by the proximity sensor 120 right after the touch ends, and change the touch trace. In this case, the changed touch trace may be regarded as a trace which is consistent with the user's initial intention.

According to another exemplary embodiment, the controller 130 may change a touch trace by adding a touch trace sensed by the touch sensor, a motion trace of an object before a touch starts and a motion trace of an object after the touch ends. That is, by including a proximate motion of an object before and after a touch is sensed by the proximity sensor 120, sufficient data to change the touch trace may be provided.

Meanwhile, in response to there being a large number of coordinate values of a user gesture input through the touch sensor 110, a determination may be made that there is a great amount of motions of a user gesture. In addition, the controller 130 may further consider a coordinate value of a motion of an object before and after a touch sensed through the proximity sensor 120 in order to determine the amount of motions of a user gesture.

That is, in response to the touch sensor 110 being touched by a user with strong intensity for a long time and thus, there are a lot of converted coordinates values, the controller 130 may determine that there are a great amount of motions of a user gesture and may rapidly control the contents of the electronic apparatus 100 controlled by the touch input.

In addition, the controller 130 may add a coordinate value of a motion of an object sensed through the proximity sensor 120 to a coordinate value of a user gesture input through the touch sensor 110 in order to determine the amount of motion of the user gesture.

Accordingly, the controller 130 may determine that there is a great amount of motions of a user gesture in response to there being a lot of coordinates values of a motions of an object sensed through the proximity sensor 120 even though there are a small number of coordinates values of the user gesture sensed through the touch sensor 110.

Figure 4:
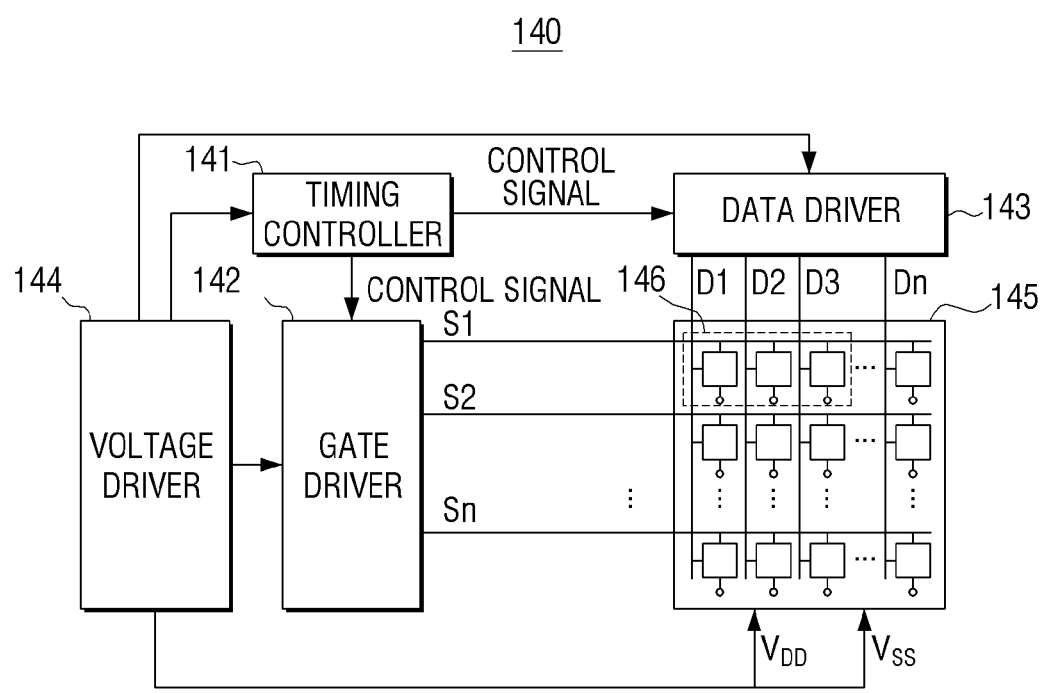
FIG. 4 is a view which illustrates an example of configuration of a display.

Meanwhile, the electronic apparatus 100 may include the display 140, and the detailed configuration of the display 140 is as shown in FIG. 4. That is, the display 140 may further include a processing circuit such as a display panel 145, a timing controller 141, a gate driver 142, a data driver 143, and a voltage driver (not shown). In addition, the display 140 may further include a frame buffer (not shown).

The timing controller 141 receives a clock signal, a horizontal sync signal (Hsync), a vertical sync signal (Vsync), etc. which are appropriate for the display panel 145 from the outside, generates a gate control signal (scan control signal) and a data control signal (data signal), and respectively output the signals to the gate driver 142 and the data driver 143.

The voltage driver 144 is an element to transmit a driving voltage to the gate driver 142, the data driver 143, the display panel 145, etc. Specifically, the voltage driver 144 may provide the display panel 145 with the necessary VDD or VSS. In addition, the voltage driver 144 may generate Vgh and provide it to the gate driver 142.

The gate driver 142 is connected to the display panel 145 through scan lines S1, S2, S3, . . . , Sn. The gate driver 142 applies a gate on/off voltage (Vgh/Vgl) provided from the voltage driver 144 to the display panel 145 according to a gate control signal generated by the timing controller 141.

The data driver 143 is connected to the display panel 145 through data lines D1, D2, D3, . . . , Dm. The data driver 143 inputs RGB data of an image frame in the display panel 145 according to a control signal generated by the timing controller 141.

The display panel 145 is configured to form a pixel area 146 where a plurality of gate lines (not shown) and a plurality of data lines DL1-DLn are crossed with each other. In response to the display panel 145 operating according to an OLED method, each pixel area 146 may be configured to form a light emitting element of R, G, B like OLED. A switching element, that is, TFT is formed in each pixel area 146. In addition, sensors to sense a user manipulation using a user's body or a pen may be disposed at a lower part of each pixel area 146. That is, the touch sensor 110 and the proximity sensor 120 may be disposed along with the display 110 to sense a user manipulation by the pixel unit.

Figure 5:
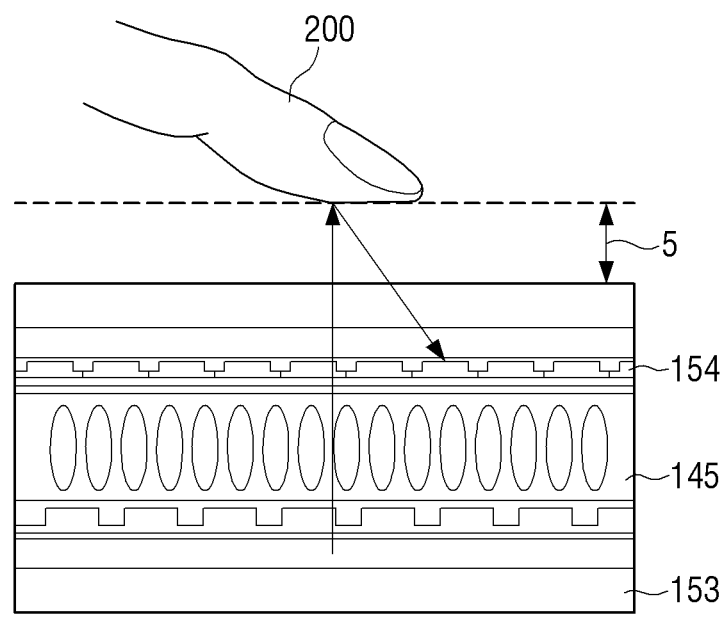
FIG. 5 is a view provided to explain a method of detecting a proximity manipulation of a user.

The operation of the proximity sensor 120 will be described in detail with reference to FIG. 5. The proximity sensor 120 may further include an infrared ray source 153 and an infrared ray sensor 154. The infrared rays source 153 may be disposed in one surface of the display panel 145 inside the display 140, and the infrared sensor 154 is disposed on the other surface of the display panel 145. The infrared rays source 153 irradiates an infrared rays in the direction of the surface of the display panel 145. Accordingly, a certain area where an approach of the user's finger 200 can be recognized exists on the surface of the display panel 145, which becomes an effective recognition area 5 where a proximity touch can be recognized.

The infrared rays sensor 154 may include a plurality of infrared ray sensing elements which are disposed in the form of array. Accordingly, in response to the finger 200 approaching into the effective recognition area 5, the infrared ray sensor 154 may generate an infrared ray scan image by sensing infrared rays which are reflected by the finger 200. The electronic apparatus 100 may sense a proximity touch input by using the generated infrared scan image.

The proximity sensor 120 may also sense a case where the pen 200 approaches. That is, an object which touches the touch sensor 110 may be other apparatus than a user's finger.

Figure 7:
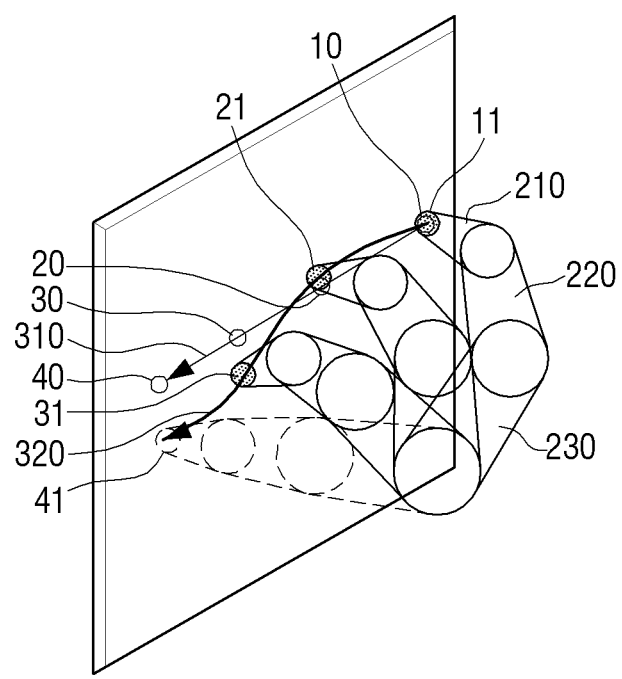
FIG. 7 is a view which illustrates a case where a touch trace in a longitudinal direction is input according to an exemplary embodiment.
Figure 8:
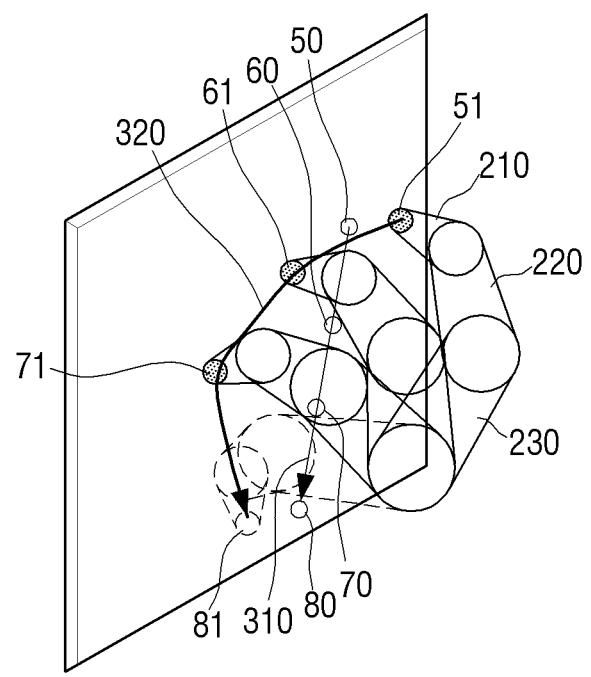
FIG. 8 is a view which illustrates a case where a touch trace in a latitudinal direction is input.

FIGS. 7 and 8 are views which illustrate a case where a touch trace in a longitudinal direction and a latitudinal direction is input using a user's finger as an object, according to an exemplary embodiment.

In response to the electronic apparatus 100 being a small-scale apparatus, a touch command is input using only one hand in many cases. A user's finger consists of three joints, that is, a first joint finger bone, a middle joint finger bone and the last joint finger bone, instead of a plurality of joints.

In particular, in response to a user gripping an electronic apparatus using one hand, the user usually uses a thumb which does not have a middle joint finger bone.

Accordingly, in response to a touch being input using a thumb as an object, a metacarpal bone 230 which connects the first joint finger bone of the thumb with a wrist bone is half-fixed, and only two little joints 210, 220 are manipulated and thus, a touch trace which is input by a thumb may be different from what the user intended.

Specifically, a case where a touch trace in a longitudinal direction is input by a user will be described with reference to FIG. 7.

In response to an object being a user's finger, a touch trace 310 which is intended by the user may be different from a touch trace 320 which is actually input due to biological reasons. That is, an initial touch point 10 intended by the user is almost consistent with an actual initial touch point 11. However, as the time for drawing a touch trace elapses, there may be a difference between an end point 30 intended by the user and an actual touch end point 31.

However, a location 41 where a motion of an object is sensed right after the touch ends, which is sensed by the proximity sensor 120 may be closer to the touch trace 310 which is originally intended by the user again.

Thus, in response to the location 41 where a motion of an object is sensed right after the touch ends, which is sensed by the proximity sensor 120, being converted to a coordinate value, and the input touch trace is changed by applying a weighted value, the location of the object after the touch may be closer to the touch trace 310 which is intended by the user than a trace which connects points 11, 21, 31 where actual touches are input.

FIG. 8 is a view which illustrates a case where a touch trace in a latitudinal direction is input.

In a case where a touch trace in a latitudinal direction is input, there may also be a difference between the touch trace 310 which a user intends to input and the touch trace 320 which is actually input in response to an object being a user's finger due to biological reasons.

In particular, because of the above-described biological structure of a finger, a touch trace in a latitudinal direction may be input to draw an excessive arc. Accordingly, there may be a difference between the middle points 50, 60, 70 intended by a user and the points 51, 61, 71 where actual touches are input, as illustrated in FIG. 8.

However, a location 81 where a motion of a object right after a touch ends, which is sensed by the proximity sensor 120, may be closer to the touch trace 310 which is originally intended by the user again.

Thus, in response to the location 81 where a motion of an object is sensed right after the touch ends, which is sensed by the proximity sensor 120, being converted to a coordinate value, and the input touch trace is changed by applying a weighted value, the location of the object after the touch may be closer to the touch trace 310 which is intended by the user than a trace which connects points 51, 61, 71 where actual touches are input.

In FIGS. 7 and 8, a touch trace may be changed by applying a weighted value as described above, but this is only an example. A touch trace may be changed in various ways, such as by connecting a touch start point with a point which is sensed by a proximity sensor right after the touch ends, so that the touch trace may become consistent with what the user intended.

FIGS. 9 to 12 are views which illustrate a case where the electronic apparatus 100 has a distorted operation grid according to the direction of a user's hand in which the user grips the electronic apparatus.

Figure 9:
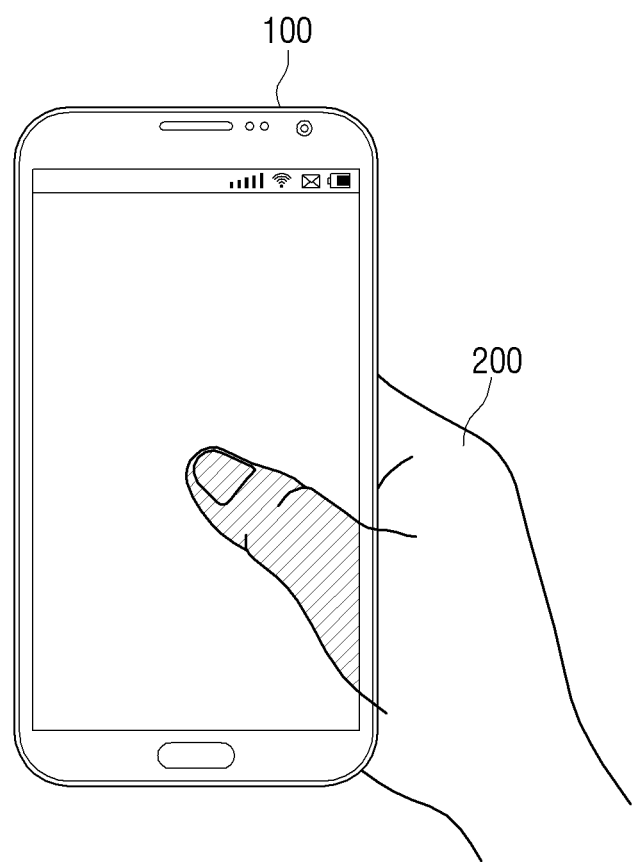
FIG. 9 is a view which illustrates a case where a user grips an electronic apparatus using a right hand.
Figure 10:
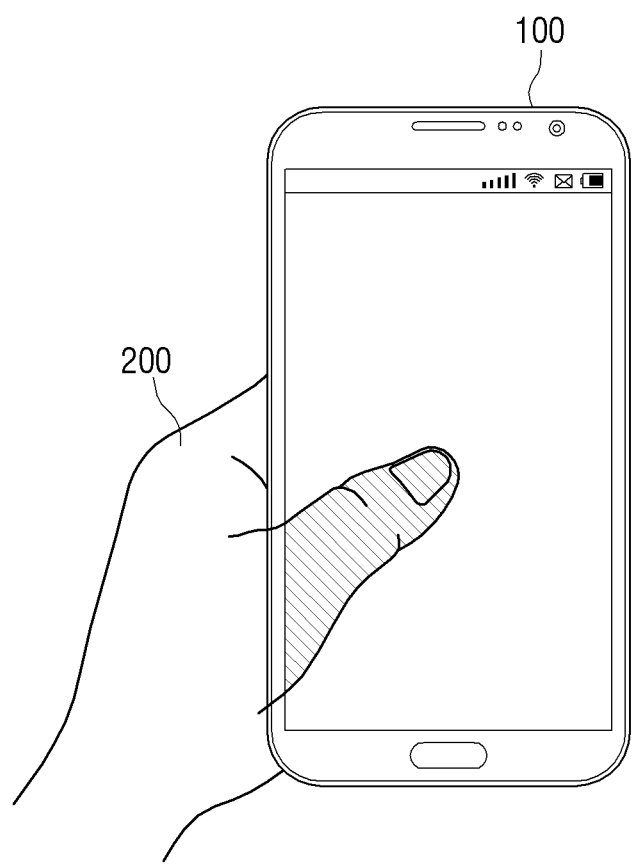
FIG. 10 is a view which illustrates a case where a user grips an electronic apparatus using a left hand.

FIGS. 9 and 10 illustrates a case where the electronic apparatus 100 is implemented as a mobile phone, and the display 140 includes the touch sensor 110 and the proximity sensor 120.

The proximity sensor 120 may sense the shape of a user's hand which grips the electronic apparatus 100, and the controller 130 may determine which hand grips the electronic apparatus 100 based on the sensed shape of the user's hand.

Figure 11:
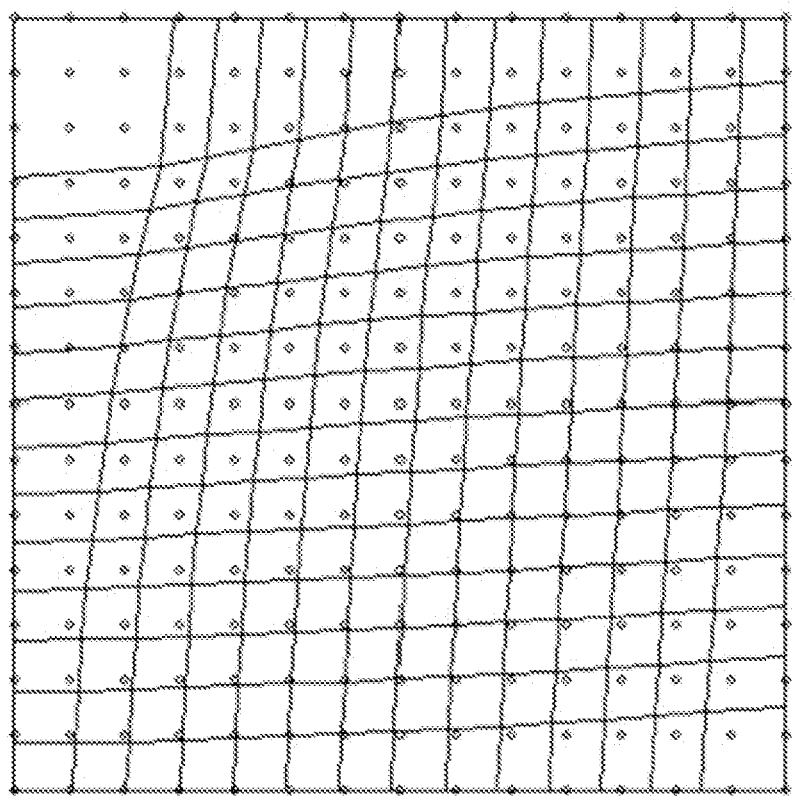
FIG. 11 is a view which illustrates a distorted operation grid of an electronic apparatus in response to a user gripping the electronic apparatus using a right hand.

In response to the hand which grips the electronic apparatus 100 being a right hand, the controller may perform a control operation to have an operation grid in the shape of a square grid which is tilted downwards from right to left, as illustrated in FIG. 11.

That is, in response to the electronic apparatus 100 being gripped by a right hand and a touch square is input, a touch square which goes down from right to left in an oblique line may be input due to the biological structure of the right hand.

Accordingly, the controller 130 may perform a control operation to have a distorted operation grid, and recognize the touch square which goes down from right to left in an oblique line as a touch trace which moves horizontally from right to left.

Figure 12:
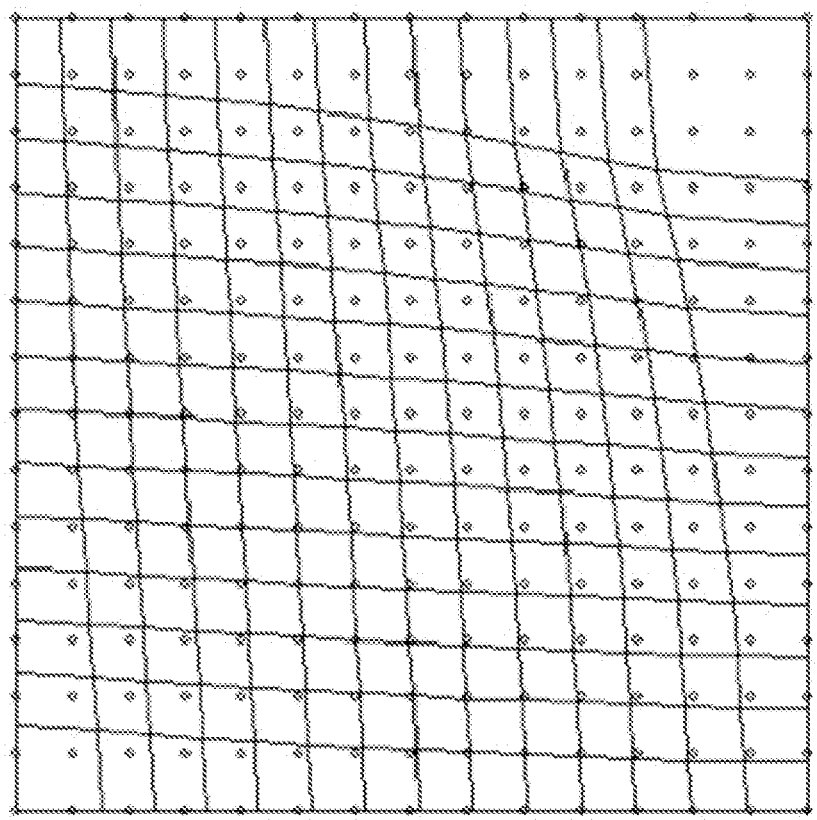
FIG. 12 is a view which illustrates a distorted operation grid of an electronic apparatus in response to a user gripping the electronic apparatus using a left hand.

In response to the hand which grips the electronic apparatus 100 being a left hand as illustrated in FIG. 12, the controller 130 may perform a control operation to have an operation grid in the shape of square grid which is tilted downwards from left to right, as illustrated in FIG. 12.

That is, in response to the electronic apparatus 100 being gripped by a left hand and a touch square is input, a touch square which goes down from left to right in an oblique line may be input due to the biological structure of the left hand.

Accordingly, the controller 130 may perform a control operation to have a distorted operation grid, and recognize the touch square which goes down from left to right in an oblique line as a touch trace which moves horizontally from left to right.

Figure 6:
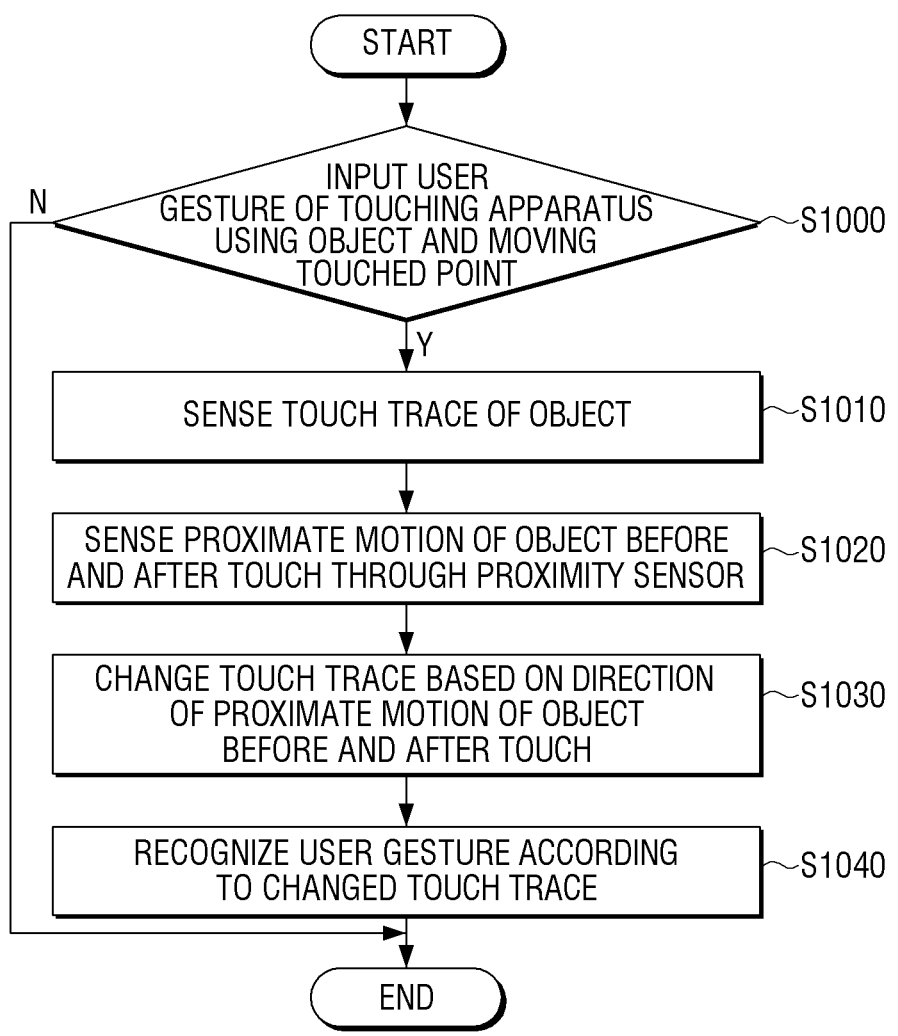
FIG. 6 is a flowchart provided to explain a method of recognizing a user gesture according to an exemplary embodiment.

FIG. 6 is a flowchart provided to explain a method of recognizing a user gesture of the electronic apparatus 100, according to an exemplary embodiment. According to FIG. 6, the electronic apparatus 100 determines whether a user gesture of touching an object and moving the touched point is input (S1000). In response to the user gesture is input (S1000-Y), the touch trace of the object is sensed (S1010). That is, the touch trace in a latitudinal direction, in a longitudinal direction or in an oblique direction may be sensed.

The proximity sensor 120 senses a proximate motion of an object before and after the touch (S1020). That is, the electronic apparatus 100 may sense not only the touch trace but also a motion of an object which exists within a predetermined distance, through the proximity sensor 120.

Subsequently, the touch trace is changed based on the motion direction of the object before and after the touch (S1030). That is, the touch trace may be changed by applying a higher weighted value to a coordinate value at a location of the proximate motion of the object before and after the touch as the location approaches the touched point. Alternatively, touch trace may be changed by applying a weighted value to a coordinate value at a location of the proximate motion of the object right before and after the touch, and the touch trace may be changed such that a line connecting a touch start point with a point of the proximate motion of the object right before and after the touch can be recognized as a user gesture. Meanwhile, a user gesture is recognized along the changed touch trace (S1040.

As described above, according to various exemplary embodiments, a user's manipulation intension can be assumed by considering not only a user's touch trace but also a motion of an object which is sensed before and after the touch. Therefore, the type of a user gesture in accordance with the user's manipulation intension may be determined, and a control operation may be performed accordingly. Accordingly, even in response to a user gripping the electronic apparatus 100 using one hand, or it is difficult for a user to manipulate the apparatus 100 normally because of disability or injury of a hand, where a touch malfunction may occur due to the limit in the size or shape of the display, a control operation which complies with a user's intention may be performed.

The method of recognizing a user gesture of an electronic apparatus according to the above various exemplary embodiments may be stored in a non-transitory readable storage medium. The non-transitory readable storage medium may be mounted and used on various apparatuses.

The non-transitory recordable storage medium refers to a medium which may store data semi-permanently rather than storing data for a short time such as a register, a cache, and a memory and may be readable by an apparatus. Specifically, the non-temporal recordable medium may be CD, DVD, hard disk, Blu-ray disc™, USB, memory card, ROM, etc.

The foregoing embodiments and advantages are merely exemplary and are not to be construed as limiting the present invention. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An electronic apparatus comprising:
    a touch sensor configured to sense a trace of a touch of an object in response to a user gesture of touching a point of the electronic apparatus using the object and moving the touched point being input;
    a proximity sensor configured to sense a motion of the object before and after the touch; and
    a controller configured to reposition the sensed touch trace by applying a different weighted value to a motion of the object before and after the touch, according to a distance from the touched point and recognize the repositioned touch trace as the input user gesture.

2. The apparatus as claimed in claim 1, wherein the controller is configured to reposition the touch trace by applying a first weighted value to the motion direction of the object which is sensed before the touch starts and applying a second weighted value which is greater than the first weighted value to the motion direction of the object which is sensed after the touch ends.

3. The apparatus as claimed in claim 1, wherein the touch sensor is configured to apply an operation grid in a predetermined form to a plurality of touch sensors which are disposed in a form of a matrix and sense the touched point with reference to the operation grid,
    wherein the controller is configured to determine a user's grip direction regarding the electronic apparatus based on a motion of the object which is sensed through the proximity sensor and changes the operation grid according to the user's grip direction and recognizes the user gesture with reference to the changed operation grid.

4. The apparatus as claimed in claim 3, wherein the controller is configured to change each cell of the operation grid to tilt from the first direction to a second direction in response to the direction of the user's grip direction being a first direction, and to change each cell of the operation grid to tilt from the second direction to the first direction of the display in response to the user's grip direction being the second direction.

5. The apparatus as claimed in claim 1, wherein the controller is configured to recognize a line connecting the motion of the object which is sensed through the proximity sensor right before and after the touch with the touched point sensed through the touch sensor as the user gesture.

6. The apparatus as claimed in claim 1, wherein the controller is configured to reposition the touch trace by adding a touch trace sensed by the touch sensor, a motion trace of the object before the touch starts, and a motion trace of the object after the touch ends.

7. A method of recognizing a user gesture, the method comprising:
    sensing a trace of a touch of the object in response to a user gesture of touching a point of the electronic apparatus using an object and moving the touched point being input;
    sensing a motion of the object before and after the touch through a proximity sensor; and
    repositioning the sensed touch trace by applying a different weighted value to the motion of the object before and after the touch according to a distance from the touched point; and recognizing the repositioned touch trace as the input user gesture.

8. The method as claimed in claim 7, wherein the repositioning the touch trace comprises changing the touch trace by applying a first weighted value to a direction of the motion of the object which is sensed before the touch starts and applying a second weighted value which is greater than the first weighted value to a direction of the motion of the object which is sensed after the touch ends.

9. The method as claimed in claim 7, wherein the touch sensor applies an operation grid in a predetermined form to a plurality of touch sensors which are disposed in a form of a matrix and senses the touched point with reference to the operation grid,
    wherein the recognizing the user gesture comprises determining a user's grip direction regarding the electronic apparatus based on the motion of the object which is sensed through the proximity sensor, and
    changing the operation grid according to the user's grip direction and recognizing the user gesture with reference to the changed operation grid.

10. The method as claimed in claim 9, wherein the repositioning the touch trace comprises changing each cell of the operation grid to tilt from a first direction to a second direction in response to the user's grip direction being the first direction, and changing each cell of the operation grid to tilt from the second direction to the first direction in response to the user's grip direction being the second direction.

11. The method as claimed in claim 7, wherein the recognizing the user gesture comprises recognizing a line which connects the motion of the object which is sensed through the proximity sensor right before and after the touch with the touched point sensed through the touch sensor as the user gesture.

12. The method as claimed in claim 7, wherein the repositioning the touch trace comprises changing the touch trace by adding a touch trace sensed by the touch sensor, a motion trace of the object before the touch starts, and a motion trace of the object after the touch ends.

13. An electronic apparatus comprising:
a touch sensor configured to sense a trace of a touch of an object in response to a user gesture;
a proximity sensor configured to sense a motion of the object before and after the touch; and
a controller configured to change the touch trace based on a direction of the motion of the object before and after the touch, wherein the controller is configured to change the touch trace by applying a first weighted value to a motion direction of an object which is sensed before the touch starts and applying a second weighted value which is greater than the first weighted value to a motion direction of an object which is sensed after the touch ends, and recognize the user gesture according to the changed touch trace.

14. The electronic apparatus of claim 13, wherein the user gesture comprises touching the electronic apparatus using the object and moving the touched point being input.

15. The electronic apparatus of claim 13, wherein the touch sensor is configured to apply an operation grid in a predetermined form to a plurality of touch sensors which are disposed in a form of a matrix and sense the touched point with reference to the operation grid.

16. The electronic apparatus of claim 15, wherein the controller is configured to determine a direction of a user's grip regarding the electronic apparatus based on the proximate motion of the object which is sensed through the proximity sensor and changes the operation grid according to the user's grip direction and recognizes the user gesture with reference to the changed operation grid.

17. The electronic apparatus of claim 15, wherein the controller is configured to change each cell of the operation grid to tilt from a first direction to a second direction in response to the direction of the user's grip direction being the first direction, and change each cell of the operation grid to tilt from the second direction to the first direction of the display in response to the user's grip direction being the second direction.

18. The electronic apparatus of claim 13, wherein the controller is configured to recognize a line connecting the motion of the object which is sensed through the proximity sensor right before and after the touch with a touch start point sensed through the touch sensor as the user gesture.

* * * * *